(12) United States Patent
Ka et al.

(10) Patent No.: US 6,324,546 B1
(45) Date of Patent: Nov. 27, 2001

(54) AUTOMATIC LOGGING OF APPLICATION PROGRAM LAUNCHES

(75) Inventors: Chong I. Ka, Redmond; Andrew C. Glass, Carnation, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/172,103

(22) Filed: Oct. 12, 1998

(51) Int. Cl.$^7$ ........................................ G06F 17/30
(52) U.S. Cl. ..................... 707/203; 707/202; 707/204; 707/511
(58) Field of Search ................. 707/10, 202, 203, 707/204, 511; 705/400; 713/201; 395/712, 200.54; 709/224; 712/244; 702/186

(56) References Cited

U.S. PATENT DOCUMENTS

| | | | |
|---|---|---|---|
| 4,400,783 | * | 8/1983 | Locke, Jr. et al. ............... 702/58 |
| 5,023,907 | * | 6/1991 | Johnson et al. ............... 380/4 |
| 5,386,369 | * | 1/1995 | Christiano ............... 705/400 |
| 5,390,297 | * | 2/1995 | Barber et al. ............... 713/201 |
| 5,574,907 | | 11/1996 | Jernigan, IV et al. ............... 707/1 |
| 5,579,222 | * | 11/1996 | Bains et al. ............... 395/712 |
| 5,654,905 | * | 8/1997 | Mulholland et al. ............... 702/186 |
| 5,701,463 | * | 12/1997 | Malcolm ............... 707/10 |
| 5,796,825 | * | 8/1998 | McDonnal et al. ............... 380/4 |
| 5,901,308 | * | 5/1999 | Cohn et al. ............... 712/244 |
| 5,905,860 | * | 5/1999 | Olsen et al. ............... 380/4 |
| 6,018,619 | * | 1/2000 | Allard et al. ............... 395/200.54 |
| 6,021,428 | * | 2/2000 | Duvvoori et al. ............... 709/224 |
| 6,021,492 | * | 2/2000 | May ............... 713/200 |
| 6,115,680 | * | 9/2000 | Coffee et al. ............... 702/187 |

FOREIGN PATENT DOCUMENTS

| | | | |
|---|---|---|---|
| 0836132A1 | * | 4/1998 | (EP). |
| 96/07961 | * | 3/1996 | (WO). |

OTHER PUBLICATIONS

Bach, M.J., "Process Control", In: The Design of the Unix Operating System, Prentice Hall, Englewood Cliffs, NJ, pp. 191–246, (1986).

Tsichritzis, D.C., et al., "Processor Allocation", In: Operating Systems, Academic Press, New York, pp. 52–68, (1974).

* cited by examiner

*Primary Examiner*—Thomas Black
*Assistant Examiner*—Charles L. Rones
(74) *Attorney, Agent, or Firm*—Workman, Nydegger & Seeley

(57) ABSTRACT

Computer systems typically include many application programs which enable uses to perform a wide range of tasks. The application programs are generally stored on high-capacity memory devices, such as hard drives. Many of these high-capacity memory devices are slow relative to other components of computer system and thus noticeably reduce the overall performance, particularly during start of application programs. One way of improving performance is to organize application programs in memory devices so that often-used application programs are stored in areas that are faster to access or otherwise have less effect on computer performance. Unfortunately, there is no convenient way of keeping track of how often each application program is used. Accordingly, the inventors devised an operating system that logs, or records, certain information every time an application program is started. The log ultimately provides a convenient measure of how frequently application programs are used. Another facet of the invention includes using the log to reorganize how application programs are stored in a memory device.

34 Claims, 5 Drawing Sheets

| | FILENAME | PATHNAME | TOTAL LAUNCHES | LAST LAUNCH DATE | FILE SIZE | LAST MODIFIED | WARM LOG COUNT | COLD LOG COUNT |
|---|---|---|---|---|---|---|---|---|
| 80a | APP 1 | C:/APP1 | 42 | 10 07 1998 | 100K | 10 01 1998 | 20 | 10 |
| 80b | APP 2 | | | | | | | |
| 80c | APP 3 | | | | | | | |
| | | | | | | | | |

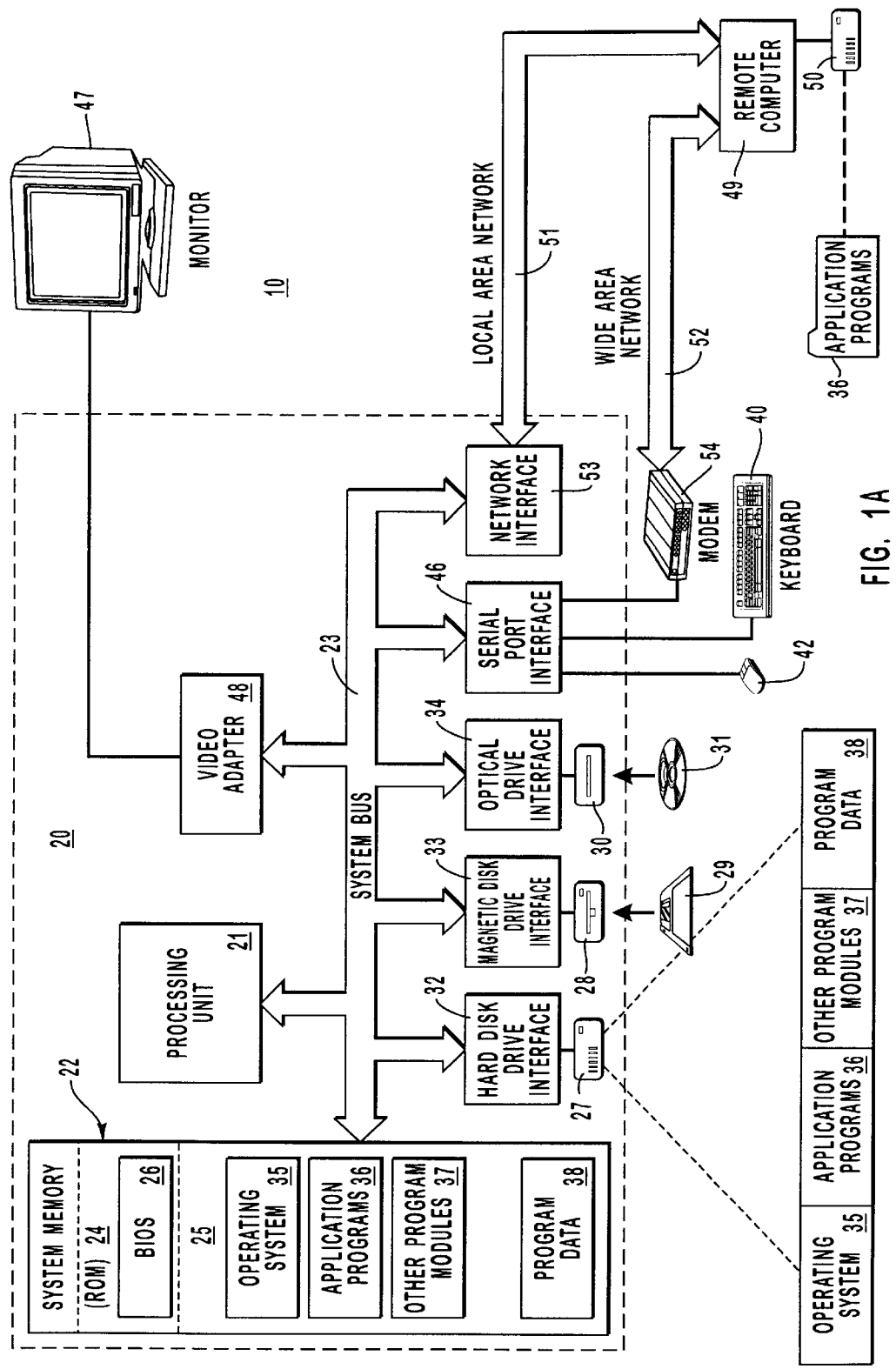

| FILENAME | PATHNAME | TOTAL LAUNCHES | LAST LAUNCH DATE | FILE SIZE | LAST MODIFIED | WARM LOG COUNT | COLD LOG COUNT |
|---|---|---|---|---|---|---|---|
| APP 1 | C:/APP1 | 42 | 10 07 1998 | 100K | 10 01 1998 | 20 | 10 |
| APP 2 | | | | | | | |
| APP 3 | | | | | | | |

80a — APP 1 row
80b — APP 2 row
80c — APP 3 row

| | | | 90 |
|---|---|---|---|
| O | FILE HANDLE 1 | FILE SIZE 1 | PATH 1 & FILENAME 1 |
| R | FILE HANDLE 1 | OFFSET 1 | LENGTH 1 |
| C | FILE HANDLE 1 | — | — |
| O | FILE HANDLE 2 | FILE SIZE 2 | PATH 2 & FILENAME 2 |
| R | FILE HANDLE 2 | OFFSET 2 | LENGTH 2 |
| R | FILE HANDLE 2 | OFFSET 3 | LENGTH 3 |
| ⋮ | ⋮ | ⋮ | ⋮ |
| R | FILE HANDLE 2 | OFFSET n | LENGTH n |
| C | FILE HANDLE 2 | | |

FIG. 2C

AUTOMATIC LOGGING OF APPLICATION PROGRAM LAUNCHES

TECHNICAL FIELD

This invention concerns computer systems, software, and methods, particularly systems, software, and methods that monitor or track use of application programs.

BACKGROUND OF THE INVENTION

Personal computers allow users to do an almost unlimited number of tasks. Examples of typical tasks include drafting term papers, resumes, and letters, organizing recipes and addresses, tracking personal checking accounts and stock portfolios, communicating via electronic mail with other computer users, generating blueprints for home improvements, and making electronic photo albums. To accomplish these and other tasks, the typical computer system includes application programs—specific sets of instructions—that work with other components of the computer system to provide specific functions, such as word processing. Application programs are often called software to distinguish from the physical equipment, or hardware, of a computer system.

More particularly, a typical computer system includes a processor, a memory, a set of user-interface devices, and a display. The processor generally performs the computations and other data manipulations for performing, or executing, the instructions of application programs. The memory, which may take a variety forms, such as a memory chip or a magnetic disk, stores the application programs as well as data generated using the programs. User-interface devices, such as a keyboard and mouse, allow a user to input information into the application programs. And, the display not only presents information visually but also allows the user to interact with the information through menus and other graphical interface features.

The typical computer system also includes an operating system—a special kind of software that facilitates execution of application programs. Application programs logically combine functions or services of the operating system with those of the central processor to achieve their more complex functions. Examples of typical operating-system functions include transferring data between the central processing unit and the memory, initial processing of inputs from the keyboard and mouse, converting information for presentation on the display, and launching application programs.

One problem of typical computer systems concerns the time typical computer systems require to launch, or start, application programs. Starting an application program generally entails retrieving the instructions making up the program from a permanent memory device, such as a magnetic or optical disk, and copying them into a temporary memory device before the processor begins executing the program instructions. The instructions are copied into a temporary memory device, such a random-access memory, because these devices are generally faster than typical permanent memory devices and allow the processor to more quickly fetch and execute individual program instructions.

As processors have gotten faster and more powerful in recent years, computer programmers and software developers have created larger and larger application programs which require not only more permanent and temporary memory space but also more time to retrieve and copy their program instructions from permanent to temporary memory before processors can begin executing the instructions. This ultimately means that users experience a noticeable wait before they can begin using launched application programs. Moreover, the wait is often increased because application programs are often broken up and stored as logically linked fragments of program code. The fragments are noncontiguous, or physically disconnected, and thus require more time to retrieve than a single continuous block of code.

One way to alleviate this problem is to ensure that programs are stored as continuous blocks of code. In fact, there are special application programs, known as defragmenters, which reorganize stored data by eliminating empty spaces between "chunks" or segments of stored data. Unfortunately, this only addresses part of the problem.

None of the defragmenters recognize, as the inventors do, that the problem can be further alleviated by storing frequently used application programs in portions of permanent memory devices that are faster to access than other portions of the memory devices. In other words, there are no defragmenters which reorganize memory content based on frequency of use. Indeed, there are no convenient ways of even monitoring or tracking how frequently application programs are accessed.

Accordingly, there is a particular need not only for convenient ways of monitoring or tracking how frequently application programs are used but also for defragmenters which consider frequency-of-use data to more intelligently reorganize memory contents.

SUMMARY OF THE INVENTION

To address these and other needs, the inventors devised an operating system which senses starts, or launches, of application programs and records information about the application program and its launching in a special database, or application log. The log is later used to determine how best to reorganize a memory containing several application programs.

An exemplary embodiment incorporates the sensing and recording functions within the kernel of the Windows98 operating system. However, other embodiments implement the invention within the shell of an operating system or as a separate application program.

In addition to the operating system and application program implementations, there are several other facets of the invention. Among these are a method of sensing an application program launch and responsively recording information about the launch within an application launch log, a method of defragmenting or reorganizing a memory based on information about application launch frequencies, and a computer-readable medium, such as a magnetic or optical disk or other memory device, that includes computer-executable instructions for keeping an application-launch log. All these and other facets of the present invention are described in the drawings and the detailed description that follows.

BRIEF DESCRIPTION OF THE DRAWINGS

FIG. 1A is a block diagram of an exemplary computer system 10 embodying the invention;

FIG. 2B is a diagram of a database structure 80 for a primary application log of the present invention; and FIG. 2C is a diagram of a database structure 90 for a secondary application log of the present invention.

DETAILED DESCRIPTION OF THE INVENTION

Figure 1B:
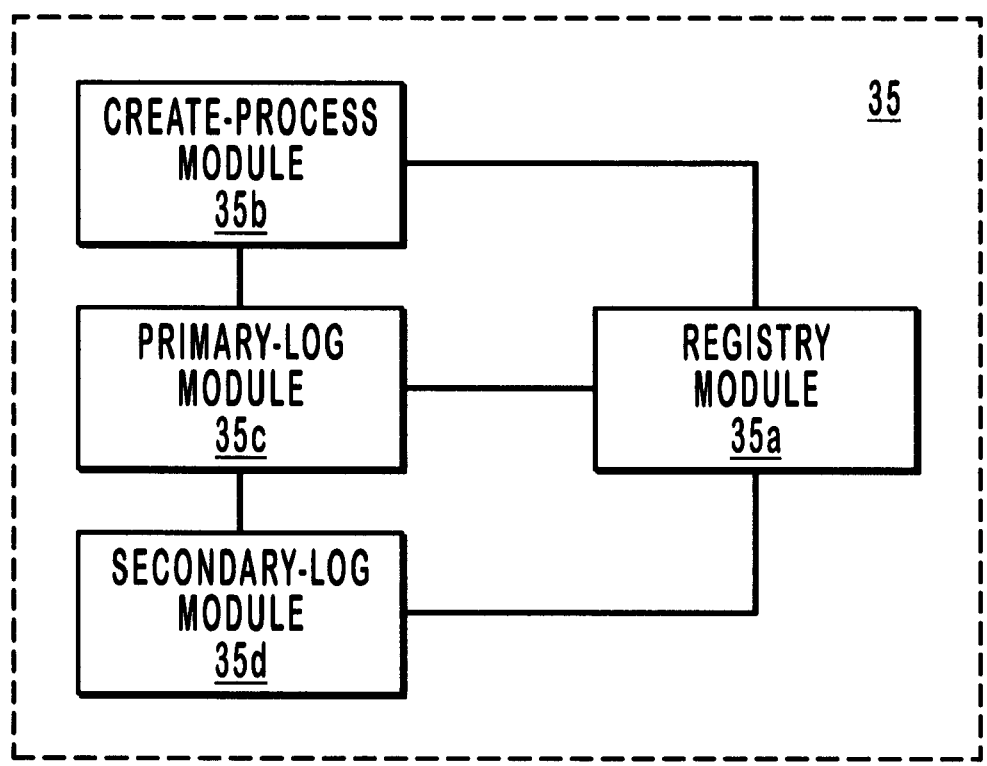
FIG. 1B is a partial block diagram of operating system 35 in computer system 10.

The following detailed description, which references and incorporates FIGS. 1A–2B, describes and illustrates one or more exemplary embodiments of the invention. These embodiments, offered not to limit but only to exemplify and teach the invention, are shown and described in sufficient detail to enable those skilled in the art to make and use the invention. Thus, where appropriate to avoid obscuring the invention, the description may omit certain information known to those of skill in the art.

Exemplary Computer System Embodying the Invention

FIG. 1A shows an exemplary computer system 10 which embodies the invention. The following description of system 10 briefly and generally describes an exemplary computer hardware and computing environment for implementing the invention. However, the invention can be practiced with other computer system configurations, including hand-held devices, multiprocessor systems, microprocessor-based or programmable consumer electronics, network PCS, minicomputers, mainframe computers, and the like. The invention can also be practiced in distributed computing environments where tasks are performed by remote processing devices linked through a communications network. In a distributed computing environment, program modules can be located in both local and remote memory storage devices.

Moreover, though not required, the invention is described in the general context of computer-executable instructions, such as program modules, being executed by a computer, such as a personal computer. Generally, program modules include routines, programs, objects, components, data structures, and so forth, that perform particular tasks or implement particular abstract data types.

More particularly, computer system 10 comprises, or includes, a general purpose computing device in the form of a computer 20, which itself includes a processing unit 21, a system memory 22, and a system bus 23 that operatively couples various system components, including system memory 22, to processing unit 21. There may be only one or there may be more than one processing unit 21, such that the processor of computer 20 comprises a single central-processing unit (CPU), or a plurality of processing units, commonly referred to as a parallel-processing environment. Computer 20 may be a conventional computer, a distributed computer, or any other type of computer. Thus, the invention is not limited to a particular computer or type of computer.

System bus 23 may be any of several types of bus structures including a memory bus or memory controller, a peripheral bus, and a local bus using any of a variety of bus architectures. The system memory, sometimes referred to as simply the memory, includes read-only memory (ROM) 24 and random access memory (RAM) 25. ROM 24 stores a basic-input-output system (BIOS) 26, containing the basic routines that help to transfer information between elements of computer 20, for example during start-up.

Computer system 10 further includes a hard-disk drive 27 for reading and writing information on a hard disk (not shown), a magnetic disk drive 28 for reading from or writing to a removable magnetic disk 29, and an optical disk drive 30 for reading from or writing to a removable optical disk 31 such as a compact-disk read-only-memory (CD ROM) or other optical media. Hard-disk drive 27, magnetic disk drive 28, and optical disk drive 30 are connected respectively to system bus 23 by a hard-disk drive interface 32, a magnetic disk drive interface 33, and an optical disk drive interface 34. These drives and their associated computer-readable media provide nonvolatile storage of computer-readable instructions, data structures, program modules and other data for computer 20. However, any type of computer-readable media which can store data accessible by a computer, such as magnetic cassettes, flash memory cards, optical disks, Bernoulli cartridges, random-access memories (RAMs), read only memories (ROMs), and the like, can be used in the exemplary operating environment.

System 10 also includes a number of program modules stored on the hard disk, magnetic disk 29, optical disk 31, ROM 24, or RAM 25. These include an operating system 35, one or more application programs 36, other program modules 37, and program data 38. Operating system 35 provides numerous basic functions and services to application programs 36 stored by system memory 22, hard-disk drive 27, and/or hard-disk drive 50. For general details on the types of functions and services, refer to the Microsoft Windows98 Resource Kit (ISBN 1-57231 644-6) or Microsoft Windows at a Glance (ISBN 1-57231-631-4) which are both incorporated herein by reference. The invention, however, is not limited to a particular operating-system type or architecture. Indeed, the invention can be incorporated in any number of existing operating systems, such as the Microsoft Windows 95 operating system, the Microsoft Windows NT 4.0 operating system, the IBM OS/2 operating system, and the Apple Computer operating system.

FIG. 1B, a partial block diagram, shows that exemplary operating system 35 includes a registry module 35a, a create-process (or application-starter) module 35b, a primary-log module 35c, and a secondary-log module 35d which cooperate to implement the application-logging feature that is central to the invention. Although not explicitly shown in FIG. 1B, the exemplary embodiment places modules 35a, 35b, and 35c within the kernel of operating system 35. However, other embodiments place one or more of these modules in the operating system shell. Furthermore, still other embodiments provide a separate application program that includes one or more of the modules. The functions of the modules are explained in detail below. It should be appreciated, however, that the functions of the invention can be grouped and replicated in numerous other ways. Thus, the invention is not limited to any particular functional division.

A user may enter commands and information into personal computer 20 through input devices such as a keyboard 40 and pointing device 42. Other input devices (not shown) may include a microphone, joystick, game pad, satellite dish, scanner, or the like. These and other input devices are often connected to processing unit 21 through a serial port interface 46 that is coupled to the system bus, but may be connected by other interfaces, such as a parallel port, game port, or a universal serial bus (USB). A monitor 47 or other type of display device is also connected to system bus 23 via an interface, such as a video adapter 48. In addition to the monitor, computers typically include other peripheral output devices (not shown), such as speakers and printers.

Computer 20 may operate in a networked environment using logical connections to one or more remote computers, such as remote computer 49. In this exemplary embodiment, these logical connections include a communication device coupled to computer 20. However, the invention is not limited to a particular type of communications device. Remote computer 49, which can be another computer, a server, a router, a network personal computer (PC), a client, a peer device, or other common network node, typically includes many or all of the elements of computer 20. However, for clarity FIG. 1 only shows it including a memory storage device 50. The logical connections shown in FIG. 1 include a local-area network (LAN) 51 and a wide-area network (WAN) 52. Such networking environments are commonplace in offices, enterprise-wide computer networks, intranets and the Internet.

When used in a LAN-networking environment, computer 20 is connected to the local network 51 through a network interface or adapter 53, which is one type of communications device. When used in a WAN-networking environment, computer 20 typically includes a modem 54 or any other type of communications device for establishing communications over wide-area network 52, such as the Internet. Modem 54, which may be internal or external, is connected to system bus 23 via serial port interface 46. In a networked environment, one or more of the program modules described above (or portions thereof) can be stored in the remote memory storage device. Furthermore, the illustrated network connections shown are only exemplary and other communication means and devices for establishing a communications link between the computers may be used.

The exemplary computer can be a conventional computer, a distributed computer, or any other type of computer, since the invention is not limited to any particular computer. A distributed computer typically includes one or more processing units as its processor, and a computer-readable medium such as a memory. The computer can also include a communications device such as a network adapter or a modem, so that it is able to communicatively couple with other computers to form a computer network.

Operation of the Exemplary Computer System

The invention primarily concerns interactions among operating system 35 and application programs 36. In general, operating system 35 responds to selection or invocation of one or more of application programs 36 by creating a process according to conventional techniques, and then logging, or recording, information concerning the selected application programs in a memory, for example, hard-disk drive 27 (shown in FIG. 1A).

Figure 2A:
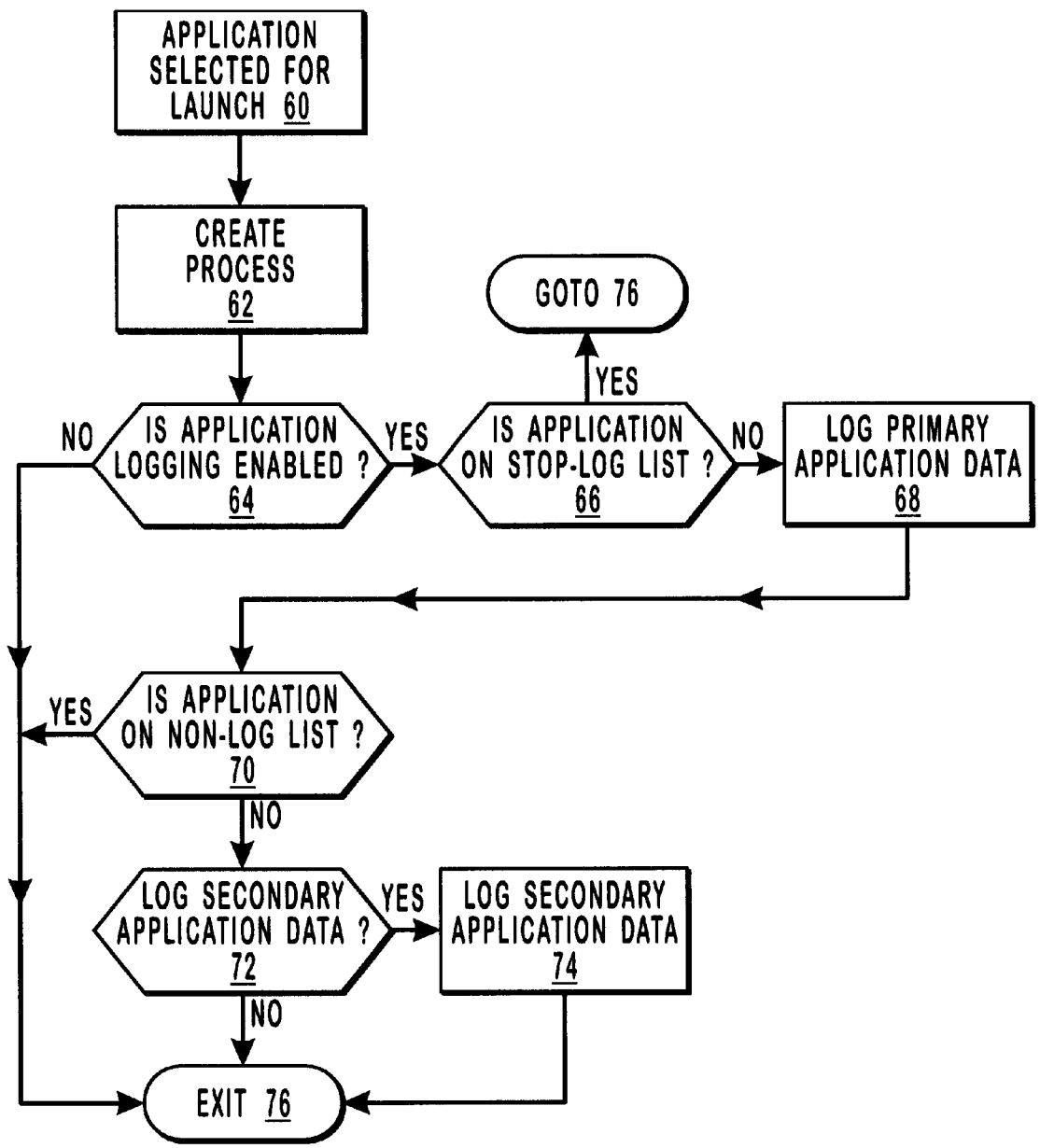
FIG. 2A is a flowchart illustrating an exemplary method of the present invention, in which operating system 35 of system 10 senses starts or launch of an application program and records an entry about the launch into hard disk 27.

More particularly, FIG. 2A shows an exemplary method of operating computer system 10 which begins at step 60 with a user selecting one of application programs 36. (Step 60 occurs under the assumption that computer system 10 has already been appropriately booted and so forth.) For example, the user could select the Microsoft Word word processing application program or the Microsoft Paint drawing application program if these were included within application programs 36. In this exemplary embodiment, the user selects an application program using keyboard 40 or mouse 42. However, in other embodiments, an application program can be invoked by another application program with or without direct user selection.

In step 62, create-process module 35b of operating system 35 follows conventional techniques to launch the selected one of application programs 36. In general, this entails creating a separate virtual address space, loading the program image into this address space, and starting to execute the program.

In step 64, processing unit 21, executing the code of primary-logging module 35b, determines whether the application-logging feature of operating system 35 is enabled. In the exemplary embodiment, this entails checking a log-enable flag in registry module 35a. If the flag is false, the application logging function has been disabled. (Disablement may be desirable to achieve maximum processor performance under certain circumstances.) If the flag is true, execution proceeds to step 66.

Step 66 determines whether the selected application program is on a stop-log list of applications stored in registry module 35a. The exemplary embodiment stores the stop list as a delimited string of application names, for example, "app1\app2\app3," where "\" is the delimiter. If the selected application program is on the stop-log list, the application-logging software terminates for duration of the current session. Termination at step 66 entails setting a log-enable flag to false and proceeding to exit block 76. (This stop-log list could easily be adapted to thwart starting of certain designated applications completely or only during certain time periods or only for certain users.) However, if the selected application program is not on the stop-log list, execution of the application-logging feature continues with step 68.

In step 68, processing unit 21 writes, records, or logs, primary application data to a reserved, primary application-log area of memory, such as hard-disk drive 27. In the exemplary embodiment, this step entails creating or updating one or more records in a database organized according to data structure 80 in FIG. 2B. Although not mentioned earlier for clarity, the exemplary embodiment copies this database from a permanent memory storage, such as hard-disk drive 27, into local memory, such as RAM 25, during start-up of computer system 10 to facilitate access to the database during record creation and update. Moreover, the exemplary embodiment writes over the "permanent" database with the local database whenever a new application program is added to the log and when the application-logging software is terminated, for example, because of the stop-list feature at step 66 or session termination.

Data structure 80 includes a number of records 80a, 80b, 80c and so forth, with each record assigned to one application program. (If a given application program lacks a record, processing unit 21 creates a new record at this step). Each record includes eight data fields: filename, path, total-launch count, last-launch date, filesize, last-modification date, warm-launch count, and cold-launch count. More particularly, filename is the name or other unique identifier of the application program, and path identifies a memory device, such as a drive and/or directory, where the application program is stored.

Total-launch count indicates how many times the application program has been launched since its installation or since installation of the application-logging software. The total-launch count for an application is incremented each time the application is launched. Last-launch date, the date the application was last launched, is also updated with each launch of the application. Filesize refers to the size of the application program in bytes or other absolute or relative measure.

Cold-launch count indicates how many times secondary application data (described below) was logged for first-time launches of the application program within a given session—an operating period defined between start-up and shutdown of computer system 10. Last-modification date is the date the application program itself was last modified, or updated. And, warm-launch count indicates how many times secondary application data (described below) has been logged for warm launches of the application program.

Step 70 determines whether the selected application is on a non-log list, that is, a list of application programs that will not be subject to secondary logging. In the exemplary embodiment the non-log list is stored in registry module 35a, again as a delimited string of application names. This feature allows one to focus the application-logging software toward or away from specific application programs. In contrast to the stop-log list of step 66 which terminates the application-logging software, the non-log list merely excludes certain application programs from the purview of secondary logging. Other embodiments of invention recast this function in positive terms, allowing one to define which application programs to monitor via secondary logging, as opposed to which to avoid monitoring via secondary logging.

If the selected application program is on the non-log list, the application-logging software proceeds to program exit block 76. However if the application is not on this list, execution continues on to step 72.

In step 72, the processor determines whether to log secondary application data concerning the selected application program to a secondary log. In the exemplary embodiment, this secondary log, or database, is a file-input-output log, and the secondary application data concerns specific memory access, particularly hard disk sectors read during launching of the selected application program. More precisely, this determination entails checking the current launch number for a just-launched application program and the launch number for the last logging of secondary application data (as stored in the primary application-launch log) against several adjustable keys stored in registry module 35a. These adjustable keys are designated W, Z, X, Y, where W denotes the maximum number of cold launches that will result in the logging of secondary application data; X denotes on which launch number secondary application data will be logged for the first time; Y denotes the number of launches to wait before the next logging of secondary application data; and Z denotes the total number of warm launches that can result in logging of secondary application data.

X and Y, which are respectively 2 and 4 in the exemplary embodiment, control how frequently secondary application data is generally logged. In particular, X sets the launch number of the launch that would result in the first logging of secondary application data. Control of when this logging occurs is important because many application programs perform "housekeeping" functions during first-time launches and not during subsequent launches. Thus, an X of 2 means that the first logging of secondary data will occur on the second launching of every application program. Y, on the other hand, indicates how many launches to skip between loggings of secondary application data. Thus, if Y is 4, then secondary logging module 35d will log secondary application data for every fourth launch after the Xth launch. If Y is 0, then secondary application data will be logged every launch after the Xth launch.

W and Z control the maximum number of warm and cold launches for which secondary application data will be logged. Cold launches are those launches that occur when an application is launched for the first time during a session. Warm launches, on the other hand, are any launches occurring after the first cold launch and within the same session as the first cold launch. The distinction between cold and warm launches recognizes that many application programs launch differently during first, or cold, launches than they do during subsequent, or warm, launches. For example, cold launches often require reading a different set of memory sectors than do warm launches of the same application program. Thus, providing maximum numbers of cold and warm launches for logging of secondary application data provides a means not only to maintain statistically superior data on a given application program but also to limit the performance liability of the application-logging software, particularly the performance liability of logging secondary application data. W and Z are respectively 1 and 3 in the exemplary embodiment.

In another embodiment, secondary log module 35d uses the W, X, Y, and Z registry keys in a slightly different way to decide whether to log or not log the secondary application data. In this other embodiment, secondary log module 35d implements the following complex if-then function:

if the launch is a cold launch then
    if cold-launch count (from primary log)<W and total-launch count (from primary application log)>=X
    then log the secondary application data;
else
    if warm-launch count (from primary application log)<Z and [Y=0 or total-launch count (from primary application log)>=(X+Y*warm-launch count)] then log the secondary application data.

Another embodiment implements this same form of complex if-then function, but replaces the total-launch count with an upgrade-launch count. In this embodiment, the upgradelaunch count is maintained as another field of primary application log records and indicates the total launch count after an application program has been upgraded. The upgrade-launch count equals the total-launch count until an upgrade occurs and then it actually reflects total launches after the upgrade. Upgrades are detected using the last-modified and filesize fields of a primary log record.

The secondary application log in the exemplary embodiment has a data structure 90 as shown in FIG. 2C, which includes entries for each file open, file read, and file close operation. More specifically, each file open entry is designated "O," and lists a file handle identifying the application program file, a filesize indicating the size or relative size of the application program file, and a complete path and file name for the application program. File reads, designated "R," are listed with the file handle, an offset address indicating where the read started, and a length indicating how much data was read. File closes, designated "C," list the file handle for the application program.

Execution of the application-logging software then proceeds to exit or termination block 76. However, before actual termination, the exemplary embodiment of the application-logging software completes two additional tasks. First, the exemplary embodiment deletes records for application programs that have not been used, that is, launched, during the preceding 13 months. And second, the exemplary embodiment writes the primary and secondary application logs from local memory, such as RAM 25, to a permanent memory device, such as hard-disk drive 27, thereby preserving their respective data for future use.

Exemplary Use of the Application Launch Log

The method of keeping an application launch log described using FIGS. 2A–2C has a virtually unlimited number of uses. For example, one can integrate the FIG. 2A method and the data structure of FIGS. 2B and 2C into conventional defragmentation software to more intelligently reorganize the contents of memory based on frequency of use, particularly application programs. More specifically, the defragmentation software can be designed to use data structure 80 and 90 created and maintained by an operating system or other specific application program. An exemplary embodiment of defragmentation software accesses the primary-application launch log, sorts the log based on frequency of use, and then reorganize the application programs in memory, with the most frequently used applications being assigned to areas of memories with optimal, for example, fastest, access times.

The exemplary embodiment bases the frequency of use of each application program on its total launch count; however, other embodiments of the invention, consider combinations of totallaunch count, last-launch date, filesize, and cold-launch count. Thus, for instance, one embodiment ranks application programs based on total-launch count and resolves ties or near ties in total-launch counts based on which application has the most-recent last-launch date, or the largest filesize, or the greatest cold-launch count.

For examples of conventional defragmentation techniques which can be used with the invention, refer to U.S. Pat. No. 5,574,907 and 5,398,142, respectively entitled Two-pass Defragmentation of Compressed Hard Disk Data with a Single Data Rewrite and Method for Eliminating File Fragmentation and Reducing Average Seek Times in a Magnetic Disk Environment. Both of these patents are incorporated herein by reference.

Other uses of the application-launch log include determining use patterns and frequencies for specific application programs. Use patterns and frequencies can be used to cull underemployed application programs or to determine which application programs warrant upgrades or to allocate training resources to new computer users.

Conclusion

In furtherance of the art, the inventors have presented an operating system which keeps a log of application program launches, or starts. Among its many uses, the log facilitates optimal reorganization of memory storing the application programs and thus can enhance computer system performance.

The embodiments described above are intended only to illustrate and teach one or more ways of practicing or implementing the present invention, not to restrict its breadth or scope. The actual scope of the invention, which embraces all ways of practicing or implementing the concepts of the invention, is defined only by the following claims and their equivalents.

What is claimed is:

1. A method of reorganizing a memory storing two or more application programs, the method comprising:

determining relative frequencies of use for the two or more application programs, with at least one of the application programs having a greater frequency of use than one or more of the other application programs; and reorganizing the two or more application programs in the memory based on relative frequencies of use of the application program.

2. The method of claim 1 wherein reorganizing the two or more application programs based on relative frequencies of use include storing the one application program having a greater frequency of use in a memory position having a lesser access time than other memory positions in the memory.

3. The method of claim 1 wherein determining relative frequencies of use for the two or more application programs comprises:

incrementing a first launch count in response to launching a first application program;

incrementing a second launch count in response to launching a second application program; and determining relative frequencies of use for the first and second applications based on the first and second launch counts.

4. The method of claim 1, wherein reorganizing the memory comprises defragmenting the memory.

5. The method of claim 1, wherein the memory is a non-volatile memory.

6. A computer-readable medium comprising:

a first set of instructions for starting or launching one or more application programs; and a second set of instructions contingent on execution of the first set of instructions for initiating recording or updating information indicating how many times the launched application program has been launched and memory accessed during launching of the application program.

7. The computer-readable medium of claim 6:

wherein the count represents a total number of times the application program has been launched;

wherein the first set of instructions are part of a create-process module of an operating system;

wherein the second set of instructions are executable as a function call within the first set of instructions; and wherein the first or second set of instructions are part of a kernel or shell of a computer operating system.

8. The computer-readable medium of claim 7 further comprising a third set of instructions for initiating recording of information about memory locations accessed during launching of the application program.

9. An operating system comprising:

an application-starter module for facilitating starting of one or more application programs; and an application-logging module responsive to the application-starter module starting an application program to initiate recording of information about the started application program in a database, the information including information about memory accessed during launching of the application program.

10. The operating system of claim 9, wherein the information about the started application program includes a number of times the application program has been started or launched.

11. The operating system of claim 1:

wherein the application-starter module is a create-process module;

wherein the application-logging module exists as a function call within the application-starter module;

wherein the application-logging module resides in a kernel or shell of the operating system;

wherein the operating system is compatible with one or more application programs that run on a version of the Microsoft Windows operating system; and wherein the database is a non-volatile memory.

12. The operating system of claim 9 her comprising another application-logging module responsive to the application-starter module starting an application program to initiate recording of information identifying one or more memory locations accessed during starting of the application program.

13. An operating system comprising:

an application-starter module for facilitating starting of one or more application programs; and an application-logging module responsive to the application-starter module starting an application program to initiate recording or updating of information indicating how many times the started application program has been started and memory accessed during starting of the application program.

14. The operating system of claim 13, wherein the application-logging module is further responsive to the application-starter module starting an application program to logically associate the recorded or updated information with information identifying the application program.

15. The operating system of claim 13:
wherein the application-starter module is a create-process module;
wherein the application-logging module exists as a function call within the application-starter module;
wherein the application-logging module resides in a kernel or shell of the operating system;
wherein the operating system is compatible with one or more application programs that run on a version of the Microsoft Windows operating system; and
wherein the database is a non-volatile memory.

16. An operating system comprising:
an application-starter module for facilitating starting of one or more application programs;
a first application-logging module responsive to the application-starter module starting an application program to initiate recording of information about the started application program in a first database; and
a second application-logging module responsive to the application-starter module starting an application program to initiate recording of information about memory locations accessed during starting of the application program in a second database.

17. The operating system of claim 16:
wherein the information about the launched application program includes:
at least one of a filename for the application program and a path for the application program; and
a number of times the application program has been launched;
wherein the application-starter module is a create-process module;
wherein the first application-logging module exists as a function call within the application-starter module or resides in a kernel or shell of the operating system; and
wherein the operating system is compatible with one or more application programs that run on a version of the Microsoft Windows operating system.

18. A computer operating system comprising:
starter means for starting or launching one or more application programs; and
logging means responsive to the starting means starting or launching at least one of the application programs to initiate recording or updating of information indicating how many times the one application program has been started and memory accessed during starting or launching of the one application program.

19. The computer operating system of claim 18:
wherein the count represents a total number of times the application program has been started;
wherein the starter means includes a create-process module;
wherein the logging means exists as a function call within the starter module;
wherein the logging means resides in a kernel or shell of the operating system; and wherein the operating system is compatible with one or more application programs that run on a version of the Microsoft Windows operating system.

20. A computer system comprising:
a processor;
a memory coupled to the processor, with the memory storing:
a first set of instructions for starting or launching one or more application programs; and
a second set of instructions contingent on execution of the first set of instructions for initiating recording of information about memory accessed during starting or launching of the one application program.

21. The computer system of claim 20:
wherein the information about the launched application program includes:
at least one of a filename for the application program and a path for the application program; and
a total number of times the application program has been launched;
wherein the first set of instructions are part of a create-process module of an operating system;
wherein the second set of instructions are executable as a function call within the first set of instructions; and
wherein the first or second set of instructions are part of a kernel or shell of a computer operating system.

22. The computer system of claim 20 wherein the operating system is compatible with one or more application programs that run on a version of the Microsoft Windows operating system.

23. A method of operating a computer system having one or more application programs, the method comprising;
incrementing a launch count for the one of the application programs in response to starting or launching at least one of the application programs; and
recording information about memory accessed during launching of the one of the application programs in response to starting or launching the one application program.

24. The method of claim 23:
wherein the launch count indicates a total number of times the one application program has been launched; and
wherein starting or launching at least one of the application programs occurs during creation of a process in an operating system environment.

25. A method of operating a computer system having one or more application programs stored in a memory, the method comprising:
logging launch count information concerning the launched one of the application programs, in response to launching at least one of the application programs; and
logging information about one or more memory locations accessed during launching the one application program, with the logged information about the one or more memory locations logically linked in a database to the launch count information.

26. The method of claim 25 wherein the launch count information includes a number of times the application program has been launched.

27. A method of operating a computer system having one or more application programs stored in a memory, the method comprising:
logging first information regarding at least one of the application programs, in response to launching of the at least one of the application programs, wherein the first information indicates one or more cumulative counts, including a cumulative number of launches for the at least one of the application programs;

determining whether to log second information regarding the at least one of the application programs in response to logging the first information, the determination being based on one of the cumulative counts indicated in the first information, wherein the second information indicates memory accessed during launching of the at least one of the application programs; and logging the second information regarding the at least one of the application programs, in response to the determination.

28. The method of claim 27, wherein the second information indicting the memory accessed includes information indicating a memory amount, a memory location, and a memory operation.

29. The method of claim 27 wherein the portion of the first information indicates a count of how many times logging of the second information has occurred for the at least one of the application programs.

30. The method of claim 27 wherein logging the second information regarding the at least one of the application programs in response to the determination comprises logging the second information in response to a Y-th launching of the at least one of the application programs after X number of launches of the at least one of the application programs, with X and Y being non-negative integers.

31. The method of claim 27:
   wherein the at least one of the application programs is subject to cold and warm launches;
   wherein the first information includes a cumulative number of cold launches for which the second information has been logged for the at least one of the application programs and a cumulative number of warm launches for which second information has been logged for the at least one of the application programs; and
   wherein logging the second information regarding the at least one of the application programs in response to the determination comprises logging the second information every Y-th launching of the at least one of the application programs after X number of launches of the at least one of the application programs, provided the cumulative number of cold launches is less than or equal to a number W and the cumulative number of warm launches is less than or equal to a number Z, with X, Y, W, and Z being non-negative integers.

32. A logging system for a computer having one or more application programs stored in a memory, the system comprising:
   means for logging first information regarding at least one of the application programs, in response to launching of the at least one of the application programs, wherein the first information indicates one or more cumulative counts, including a cumulative number of launches for the at least one of the application programs means for determining whether to log second information regarding the at least one of the application programs in response to logging the first information, the determination being based on one of the cumulative counts indicated in the first information, wherein the second information indicates memory accessed during launching of the at least one of the application programs; and means for logging the second information regarding the at least one of the application programs, in response to the determination.

33. A method of operating a computer system having one or more application programs stored in a memory, the method comprising:
   logging first information regarding at least one of the application programs that are subject to cold and warm launches, in response to launching of the at least one of the application programs, wherein the first information indicating one or more cumulative counts;

determining whether to log second information regarding the at least one of the application programs in response to logging the first information, the determination being based on one of the cumulative counts indicated in the first information; and logging the second information regarding the at least one of the application programs, in response to the determination, wherein:
      the first information includes a cumulative number of cold launches for which the second information has been logged for the at least one of the application programs and a cumulative number of warm launches for which second information has been logged for the at least one of the application programs; and
      logging the second information regarding the at least one of the application programs in response to the determination comprises logging the second information every Y-th launching of the at least one of the application programs after X number of launches of the at least one of the application programs, provided the cumulative number of cold launches is less than or equal to a number W and the cumulative number of warm launches is less than or equal to a number Z, with X, Y, W, and Z being non-negative integers.

34. A system for reorganizing a memory storing two or more application programs, comprising:
   means for determining relative frequencies of use for the two or more application programs; and
   means for reorganizing the two or more application programs in the memory based on the relative frequencies of use of the application programs.

* * * * *

UNITED STATES PATENT AND TRADEMARK OFFICE
CERTIFICATE OF CORRECTION

PATENT NO. : 6,324,546 B1
DATED : November 27, 2001
INVENTOR(S) : Chong I. Ka and Andrew C. Glass It is certified that error appears in the above-identified patent and that said Letters Patent is hereby corrected as shown below:

<u>Column 9,</u>
Line 10, change "totallaunch" to -- total launch --

<u>Column 10,</u>
Line 57, after "claim 9" change "her" to -- further --.

Signed and Sealed this

Eleventh Day of June, 2002

Attest:

Attesting Officer

JAMES E. ROGAN
Director of the United States Patent and Trademark Office